Jan. 26, 1943. A. R. HOAK Re. 22,256
MEANS FOR LOADING CARS
Original Filed March 8, 1940 2 Sheets-Sheet 1
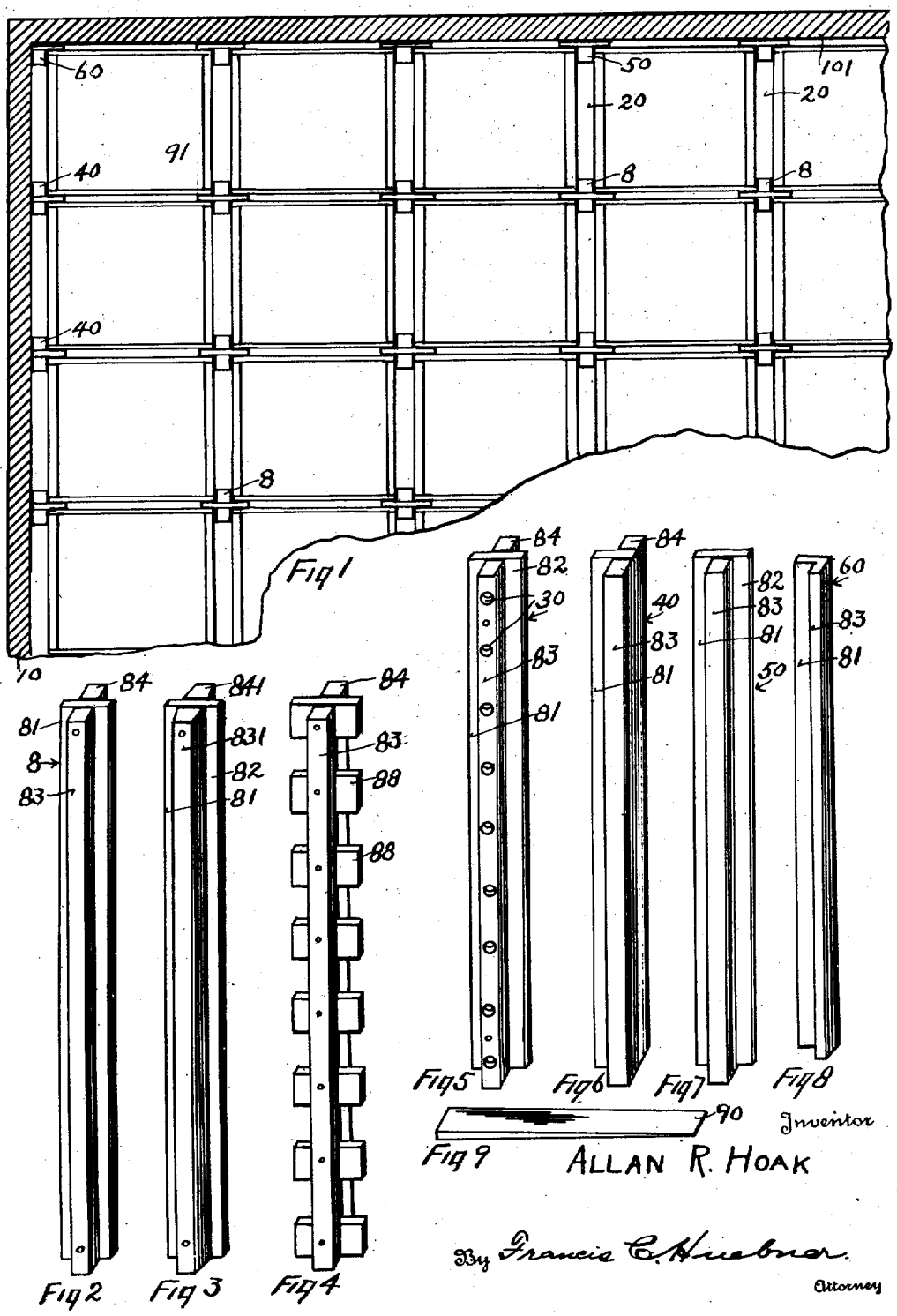
Inventor
ALLAN R. HOAK
By Francis C. Huebner
Attorney Jan. 26, 1943. A. R. HOAK Re. 22,256

MEANS FOR LOADING CARS

Original Filed March 8, 1940 2 Sheets-Sheet 2

Inventor
ALLAN R. HOAK

By Francis C. Huebner,
Attorney

Reissued Jan. 26, 1943

Re. 22,256

UNITED STATES PATENT OFFICE 22,256

MEANS FOR LOADING CARS

Allan R. Hoak, Fresno, Calif.

Original No. 2,224,432, dated December 10, 1940, Serial No. 322,988, March 8, 1940. Application for reissue November 26 1941, Serial No. 420,541

10 Claims. (Cl. 105—367)

My invention relates to an improved means for loading cars with fruit, or other perishable merchandise placed in packages for transportation.

In order to better understand my invention it is here noted that the present method for loading cars with boxes, crates, packages, or lugs, hereinafter referred to as lugs, for transportation, is to place the lugs in rows crosswise in the end of the car, nail car strips across the top of the row of lugs to more securely hold them from shifting and being jostled in the car, then to place a second row on the top of the first described row, and again nail strips thereon, and so continue until a tier of rows are thus constructed, and in the same manner build successive tiers to fill the car. In order to keep the load of lugs from side shifting and jostling about in the car during transportation, it is necessary to place the lugs close together in the row so they support each other, and likewise to put the tiers close together to form a solid pack, or load. As the inside width of the car is seldom an exact multiple of the length of the lugs, unwanted spaces in this form of loading exist between the load and the walls of the car. To compensate for these spaces between the wall and the load, the car strips are extended at either end so the alternate car strips bear against opposite walls of the car. This is the only means provided in the present used method, to prevent the load of lugs from shifting sidewise, thus loosening the load, and subjecting the lugs to be jostled in the car. As the car strips are normally one-half inch in thickness and two inches in width the precaution stated for preventing side shifting is not sufficient. This results in extensive damage to fruits and merchandise thus loaded which is shipped long distances, through the shifting of the load and resultant broken lugs and packages.

It is also noted that in unloading the car, the strips must be torn or ripped from the lugs to which they were nailed, which procedure likewise results in broken lugs and damaged fruit.

It is further noted that when the lugs of fruit are packed closely together, forming a compact load as hereinbefore described, the only opportunity to secure ventilation between the lugs is through the small open spaces between the top of one lug and the bottom of the lug next above, the lugs generally being provided with cleats on the top and on the bottom to provide said space.

In my invention I have overcome those objections and have accomplished the following objects:

The arrangement of the lugs forming the load, with my improved spacers, form a rigid, firm and compact load which cannot shift, and will more easily withstand the shocks given to the car in transportation, thereby eliminating excessive breakage and damage to the lugs and contents which is now prevalent.

Each individual lug is braced and made secure at all four corners.

My improved method and means for loading the car holds each lug separate and apart from the adjacent lugs, thereby providing complete and adequate spaces around each individual lug for ventilation, and for refrigeration, both of which are highly necessary and desirable in the shipment of perishable products.

Skilled labor for loading the car is not required.

I eliminate the nailing of car strips to the lugs, and thus avoid damage occasioned by ripping off such strips when the car is being unloaded.

A car only partly filled can have the load thereon rigid, braced, and compact as a complete load.

To accomplish these objects I have invented the following described method, together with my improved spacers, for loading cars for transportation, described in the following specification, and illustrated on the accompanying drawings, hereby made a part of this specification, in which, Fig. 1 shows a top plan view of a plurality of lugs packed into a car with my spacers in use, a fractional view of the car only being shown.

Fig. 2 is an enlarged unit view of a spacer, or post, which is inserted at the meeting corners of the stacked lugs.

Figs. 3, 4 and 5 are each enlarged unit views of modified forms of spacers which can be substituted for the form shown in Fig. 2.

Figs. 6, 7 and 8 are modified forms of spacers which are to be used at the sides, ends and corners of the car and adjacent to the load.

Fig. 9 is a wedge adapted to occupy space when the width of the car is wider than a multiple of the width, or length of the lug and spacer.

Figure 10:
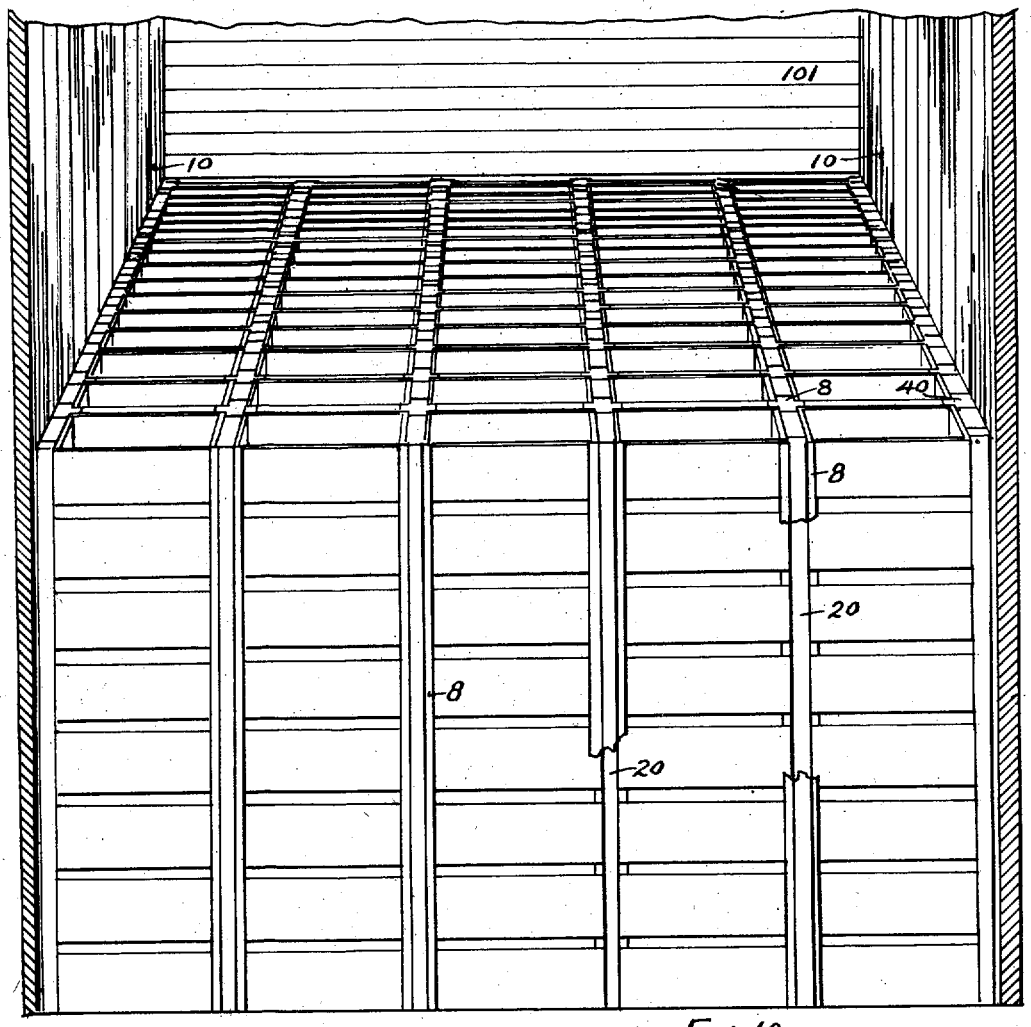
Fig. 10 is a perspective view of a portion of a load in a car, the view being taken from end of the pack of lugs.

In the drawings, 9 represents a single lug of the general character of lugs used for transporting grapes and fruit. It is rectangular in form, and they are made of uniform size for ease in handling and shipping. One form of spacer, 8, is shown in Fig. 2. This spacer is constructed of two strips of material which is approximately two inches square and the length of the height of the load, although variations from these dimensions can be made without departing from my invention. A board of approximately the same length, and wider than the thickness of the strips is inserted between the two strips, 83 and 84, and the three pieces are fastened together so they form a post, with the board forming tongues 81 and 82 projecting from opposite faces of the post. It is noted that a cross section of said spacer 8 would be in the form of a cross, as shown in Fig. 1. The side walls of the car are shown as 10, and the rear wall of the car is indicated as 101. Modified forms of spacers are shown in Fig. 8, which is a right angle form 60, to be used in loading in the corners of the car, spacer 40, shown in Fig. 6 having one of the tongues removed, which form is to be used along the side walls of the car, and a form 50 shown in Fig. 7 in which one of the strips is omitted, said form 50 being used as a spacer at the end wall of the car.

The loading of a car with these spacers is as follows: The lugs are arranged in a stack 91 the height it is desired to make the load, and the loading is started in one corner of the car with spacer 60 used in the car corner, spacer 50 placed against the back wall 101 at a corner of the lug, and a spacer 40 placed along the side wall 10 of the car at a corner of the stack of boxes. Then additional stacks of lugs are formed and positioned along the end of the car with spacers 50 placed against the back wall 101 of the car, the strip 83 functioning as a spacer to hold the stacks a spaced distance apart, and the board 81—82, functioning to space the stack of lugs from the rear wall. The stacks of lugs arranged in this manner across the end of the car form a tier of stacks, and provides open spaces 20 between the stacks of boxes, shown in Fig. 10. Spacers 8 are then positioned adjacent to openings 20, with strip 84 forced into space 20. This leaves recessed openings between the projecting strips 83 into which stacks of lugs are placed to form the next adjacent tier of lugs. The loading is thus continued with the use of spacers 50 at the ends of the tiers of lugs and against the side walls 10 of the car, and spacers between the stacks of lugs, until the aproximate center of the car is reached. Thus, in plan view, as shown in Fig. 1, the loading forms a checker board arrangement with parallel rows of stacks extending at right angles to one another. The other half of the car is then loaded in the same manner, and the two end packs forming the car load are then braced against each other, and against the ends 101 of the car by well known means of bracing not shown herein.

Figure 11:
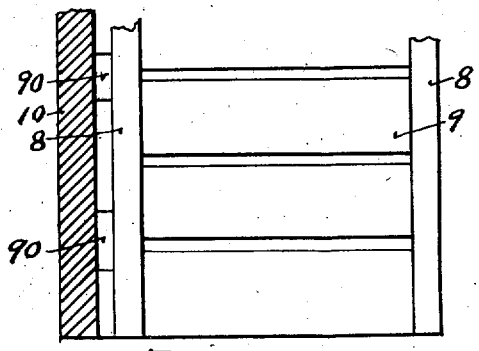
Fig. 11 is a fractional view of a wall, a stack of lugs, and wedge means for holding the stack of lugs against the wall.

It is noted that if the tier of lugs and spacers inserted between the stacks of lugs do not fit tightly between the walls 10 of the car, wedges 90, shown in Fig. 9, can be inserted between the spacers at the ends of the tiers of lugs, and the wall 10 of the car is shown in Fig. 11.

Another means for thus tightening the tiers of lugs between walls 10 of the car is accomplished by using the form of spacer shown in Fig. 3, in which strips 831 and 841 are formed with converging sides to form a wedge. When these wedge formed strips are forced in openings 20, they spread the stacks of lugs apart and thus occupy more space.

It is noted that one of the objects of my invention is to provide air spaces on all outside surfaces of each individual lug, thereby providing the opportunity for complete and adequate refrigeration and ventilation, so necessary and essential in the shipment of perishable commodities. As shown in drawings, there is a space between the top of one lug and the bottom of the next adjacent lug, when said lugs are stacked, which space is provided by cleats 96 and 97, shown in Fig. 12, and spacers 8 provide open spaces on the sides and ends of the lugs. To further promote ventilation, and adequate refrigeration which can be accomplished better with ventilation, I have provided a modified from of spacer 8, shown in Fig. 4, by providing a plurality of cross members 88 which are substituted for the board 81—82, these cross members 88 being spaced apart and clamped between, and attached to strips 83 and 84. I have also used the form of spacer shown in Fig. 5 in which a plurality of holes 30 are formed through the spacer along the line of strip 83.

Figure 12:
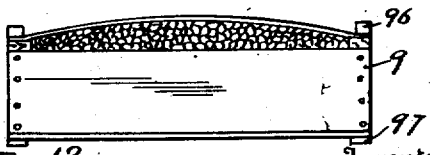
Fig. 12 is an individual lug packed with fruit.

Figs. 1, 10 and 11 show the boxes empty, as these figures were primarily intended to illustrate the method of placing the lugs in stacks, and the stacks of lugs in tiers. It is noted, however, that my invention relates more particularly to the loading in this manner of lugs which contain fruits, or other merchanidse, as is shown in Fig. 12.

I claim:

1. In combination with a pack of packages of approximately uniform shape arranged in stacks, the stacks being arranged in spaced relation in tiers, and the tiers being formed in spaced relation in a row, of spacers adapted to hold said stacks and tiers rigidly in said spaced relation, consisting of a post formed of two rigid strips attached together with members clamped between said strips, said members extending beyond the faces of the two rigid strips, said strips and portions of the members extending beyond the faces of the strips being adapted to snugly enter the interstices between adjacent stacks of packages.

2. In combination with stacks of boxes or crates of approximately rectangular shape arranged in parallel rows of tiers, said stacks of boxes being approximately uniformly spaced apart from adjacent stacks of boxes, spacers adapted to hold said stacks of boxes in said spaced relation consisting of a strip of material of such width that when positioned within the space between the stacks of boxes adjacent to the intersection of said spaces, said strip will extend over a portion of the faces of said adjacent stacks of boxes, on either side of said space, of such thickness that it will fit tightly between the adjacent stacks of boxes, and of such length that it will reach from the bottom to the top of said stacks of boxes, said strip of material having lateral winged extensions on either face thereof and at approximately right angles to said strip of material, said wings being adapted to fit tightly in the spaces between adjacent stacks of boxes and at approximately right angles to the spaces engaged by the strip of material to which said wings are attached.

3. In combination with stacks of lugs arranged in spaced relation in tiers, said tiers being arranged in spaced relation in a row, said stacking arrangement being adapted to leave a space on each side and each end of the lugs forming the stack, spacers adapted to hold said stacks in said spaced relation consisting of a rectangular post of such size that it can enter the intersecting spaces at the corners of the stacks of lugs, and extend from the bottom of the stack of lugs to the top of said stack, said post having laterally extending tongues on its faces, said tongues being of a thickness to approximately equal the width of the space between the stacks of lugs.

4. In combination with a railway car or the like, loaded with stacks of rectangular packages of similar shape and size in substantially checkerboard arrangement providing rows of stacks extending at right angles to each other; vertical angle strips disposed adjacent each of the four corners of said car respectively receiving the outside corners of the corner stacks of said load in the re-entrant corners defined by the legs of said angle strips spacing said outside corners of said corner stacks from the corners of the car; elongated T strips disposed between the said lateral walls of said car and the stacks of the outside rows of the load of stacks receiving the adjacent corners of adjacent pairs of stacks of said outside rows in the re-entrant corners defined by the adjacent sides of the head and leg of each strip thereby spacing the said adjacent pairs of stacks from each other and from the lateral sides of said car; and elongated strips of substantially Greek cross-sectional contour positioned at the adjacent four corners of each multiple of four stacks in said load receiving such four corners in the re-entrant corners defined by the adjacent arms of said latter strips thereby spacing the stacks of said load from each other and supporting said stacks from shifting laterally relative to each other.

5. In combination with a railway car, or the like, loaded with stacks of rectangular packages of similar shape and size in substantially checkerboard arrangement providing rows of said stacks extending at right angles to each other; elongated strips positioned at the corners of the packages of the outside rows of side stacks supporting the said latter packages spaced from the lateral walls of said car and supporting the adjacent stacks of the outside rows spaced from each other; and elongated strips positioned at the corners of the packages of said stacks that are disposed inwardly of the confines defined by the outer sides of the outer rows of said stacks spacing the packages of adjacent stacks of the load apart and supporting said latter packages from shifting laterally relative to each other; each of said first mentioned strips being substantially T-shape in cross section with the leg of the T disposed between the stacks of adjacent pairs thereof in said outside rows with the head of the T positioned outwardly of the outer sides of the packages of said outside rows.

6. In combination with a railway car, or the like, loaded with stacks of rectangular packages of similar shape and size in substantially checkerboard arrangement providing rows of said stacks extending at right angles to each other; single means engaged by the adjacent four corners of each multiple of four adjacent stacks in the load spacing the stacks of said rows apart and supporting the stacks in said rows from shifting laterally relative to each other; each of said single means comprising a post in substantially the form of a cross in cross-section with the said adjacent four corners being respectively positioned in the re-entrant corners defined by the adjacent pairs of arms of such cross.

7. In combination with a railway car, or the like, adjacent parallel rows of stacks of rectangular boxes of similar shape and size having corresponding lateral sides thereof in each stack respectively in co-planar relationship, each stack in each row being alongside a corresponding stack in the row adjacent thereto with one of the lateral sides of the respective boxes in each stack positioned in opposed, parallel relationship with one of the lateral sides of a box in the stack adjacent thereto of a corresponding shape and size, means engaged by the adjacent four corners of the boxes of each multiple of four adjacent stacks of said rows spacing the stacks of said rows apart and supporting the boxes in each stack from shifting laterally relative to each other and relative to the boxes in the adjacent stacks and means including the lateral side walls of said car holding the boxes in the stacks of the outermost rows thereof from moving outwardly relative to the center of the car.

8. In combination with a railway car, or the like, adjacent parallel rows of stacks of rectangular boxes of similar shape and size having corresponding lateral sides thereof in each stack respectively in co-planar relationship, each stack in each row being alongside a corresponding stack in the row adjacent thereto with one of the lateral sides of the respective boxes in each stack adjacent thereto of a corresponding shape and size, a unitary member simultaneously engaged by the adjacent four corners of the boxes of each multiple of four adjacent stacks of said rows spacing the stacks and holding the boxes in each stack from shifting laterally relative to each other and relative to the boxes in the adjacent stacks and means including the lateral side walls of said car holding the boxes in the stacks of the outermost rows thereof from moving outwardly relative to the center of the car.

9. In combination with a railway car, or the like, adjacent parallel rows of stacks of rectangular boxes of similar shape and size having corresponding lateral sides thereof in each stack respectively in co-planar relationship, each stack in each row being alongside a corresponding stack in the row adjacent thereto with one of the lateral sides of the respective boxes in each stack positioned in opposed, parallel relationship with one of the lateral sides of a box in the stack adjacent thereto having a corresponding shape and size, means free from securement to the boxes of the stacks in said rows positioned at the adjacent four corners of each multiple of four adjacent stacks of said rows spacing the stacks of said rows apart and supporting the boxes in each stack from shifting laterally relative to each other and relative to the boxes in the adjacent stacks and means including the lateral side walls of said car holding the boxes in the stacks of the outermost rows thereof from moving outwardly relative to the center of the car.

10. In combination with a railway car, or the like, a plurality of parallel rows of stacks of rectangular boxes of similar shape and size having corresponding lateral sides thereof in each stack respectively in co-planar relationship, each stack in each row being alongside a corresponding stack in the row adjacent thereto with one of the lateral sides of the respective boxes in each stack positioned in opposed, parallel relationship with one of the lateral sides of a box in the stack adjacent thereto having a corresponding shape and size, elongated strips positioned at the adjacent four corners of each multiple of four adjacent stacks of said rows spacing the stacks of said rows apart and supporting the boxes in each stack from shifting laterally relative to each other and relative to the boxes in the adjacent stacks, two of the adjacent lateral sides of the boxes in the outermost of said rows that extend at right angles to each other being in substantially parallel opposed relation to two of the lateral sides of said car, and elongated strips positioned at the adjacent two corners of the adjacent stacks in the pairs thereof in said outermost rows along said lateral sides of the boxes therein spacing the stacks of said outermost rows from the said sides of said car and supporting said boxes in said outermost rows from shifting relative to each other longitudinally of said rows.

ALLAN R. HOAK.